US012264794B2

(12) United States Patent
Xiong et al.

(10) Patent No.: US 12,264,794 B2
(45) Date of Patent: Apr. 1, 2025

(54) ELECTRICAL CONNECTOR, LAMP, AND LAMP ASSEMBLY SYSTEM

(71) Applicants: Shenzhen Intellirocks Tech. Co., Ltd., Shenzhen (CN); Shenzhen Qianyan Technology Ltd., Shenzhen (CN)

(72) Inventors: Zhiming Xiong, Shenzhen (CN); Yong Fang, Shenzhen (CN); Zhiwen Yang, Shenzhen (CN); Yan Li, Shenzhen (CN); Wenlong Wu, Shenzhen (CN)

(73) Assignees: Shenzhen Intellirocks Tech, Co., Ltd., Shenzhen (CN); Shenzhen Qianyan Technology LTD., Shenzhen (CN)

( * ) Notice: Subject to any disclaimer, the term of this patent is extended or adjusted under 35 U.S.C. 154(b) by 0 days.

(21) Appl. No.: 18/459,000

(22) Filed: Aug. 30, 2023

(65) Prior Publication Data

US 2024/0084982 A1 Mar. 14, 2024

(30) Foreign Application Priority Data

Sep. 10, 2022 (CN) ......................... 202222413730.7
Sep. 10, 2022 (CN) ......................... 202222425189.1

(51) Int. Cl.
*F21S 2/00* (2016.01)
*F21V 7/04* (2006.01)
*F21V 23/06* (2006.01)
*H01R 13/627* (2006.01)
*H01R 13/629* (2006.01)

(52) U.S. Cl.
CPC ................ *F21S 2/005* (2013.01); *F21V 7/04* (2013.01); *F21V 23/06* (2013.01); *H01R 13/6272* (2013.01); *H01R 13/629* (2013.01)

(58) Field of Classification Search
CPC ........ F21S 2/005; F21S 41/192; F21S 41/675; F21S 4/20; F21S 4/28; F21V 23/06; F21V 7/04
See application file for complete search history.

(56) References Cited

U.S. PATENT DOCUMENTS 9,004,715 B1 * 4/2015 Litke ...................... A47F 3/001 362/218
2010/0277922 A1 * 11/2010 Walton .................... F21S 8/031 362/296.01

* cited by examiner

*Primary Examiner* — William J Carter
(74) *Attorney, Agent, or Firm* — Wenye Tan

(57) ABSTRACT

A lamp includes a cover plate, a housing, and a light source assembly. At least one side wall of the housing is a light-emitting surface; the cover plate and the housing are enclosed to form an accommodating space; the light source assembly is arranged in the accommodating space; and the light source assembly emits light toward the cover plate.

10 Claims, 8 Drawing Sheets

ELECTRICAL CONNECTOR, LAMP, AND LAMP ASSEMBLY SYSTEM

CROSS-REFERENCES TO RELATED APPLICATIONS

This application claims priority to Chinese Patent Application No. CN202222413730.7, filed on Sep. 10, 2023, and Chinese Patent Application No. CN202222425189.1, filed on Sep. 10, 2023, the content of all of which is hereby incorporated by reference in entirety.

FIELD OF THE TECHNOLOGY

The present disclosure relates to the technical field of lighting equipment and, in particular, to lamps, electrical connectors, and lamp assembly systems.

BACKGROUND OF THE DISCLOSURE

With the development of the lighting market, consumers have more and more consumption demand for lamps, and higher and higher requirements for shapes of the lamps and the decorative effect of the light. How to improve the decorativeness of the shapes of the lamps and the atmospheric feel of the lamp tubes is an urgent problem to be solved. Currently, many LED light beads often only have one side that can emit light, so the existing LED lamps basically only emit light when the light-emitting surface of the LED lamp beads is facing the front, which does not have actual lighting or decorative effect. When the lamp product is used in decorative scenes, it can only be used to construct planar graphics, which greatly limits the utilization scope of the existing LED lamps.

Further, the connection between two or more lamps is usually realized by an electrical connector. Currently, one way of connection by an electrical connector to use a hard board to plug in, the electrical connection between the lamps is realized through sheets and the contact points set on the sheets. Especially, when the lamp is fixed to the installation surface (for example: a wall, a desktop, a ceiling or other planes that can be used to install the lamp) with adhesive backing, because the insertion position of the hard board is low when plugged in and there is movement parallel to the installation surface during the plugging process, there are often problems likely to occur during the connection and installation of the lamp, such as the back glue of the lamp being stick to the installation surface during installation and not able to move, resulting in poor contact or splicing gaps. Another way of connection by the electrical connector is to use a hard board clamp connection, and the electrical connection of the lamp is realized by providing buckles and spring sheet on the connector. However, the hard board clamping method is inconvenient to disassemble when the connector is installed incorrectly. These methods may lead to inconvenient and inefficient splicing and installation of lamps.

The disclosed methods and apparatus are directed to solve one or more problems set forth above and other problems.

SUMMARY

According to one aspect of the present disclosure, a lamp is provided. The lamp includes a cover plate, a housing, and a light source assembly. At least one side wall of the housing is a light-emitting surface; the cover plate and the housing are enclosed to form an accommodating space; the light source assembly is arranged in the accommodating space; and the light source assembly emits light toward the cover plate.

According to another aspect of the present disclosure, an electrical connector is provided for detachably connecting two lamps to realize an electrical connection and a mechanical connection between the two lamps. The electrical connector includes a plugging portion and a locking portion. The plugging portion is plugging-connected with a first lamp along a first direction, the plugging portion includes a plugging board, the plugging board is provided with a first connecting terminal, and the first connecting terminal is adapted for electrical connection to the first lamp. The locking portion is clamping-connected with a second lamp along a second direction, the locking portion includes a connecting board and a second connecting terminal arranged on the connecting board, the connecting board is connected to the plugging board along the first direction, the second connecting terminal is adapted for electrical connection to the second lamp, the second connecting terminal is adapted for electrical connection to the first connecting terminal, and at least one buckle is provided on and protruded from the connecting board along the second direction.

According to another aspect of the present disclosure, another lamp is provided. The lamp includes a housing having an input interface and at least one output interface; and a light source assembly disposed in the housing. The input interface and the output interface are configured to be connected to an electrical connector. The electrical connector includes a plugging portion and a locking portion. The plugging portion includes a plugging board, the plugging board is provided with a first connecting terminal, the locking portion includes a connecting board and a second connecting terminal arranged on the connecting board, the connecting board is connected to the plugging board along a first direction, the second connecting terminal is adapted for electrical connection to the first connecting terminal, at least one buckle is provided on and protruded from the connecting board along a second direction. Further, the input interface is mated and connected to the locking portion of the electrical connector, the second connecting terminal of the locking portion is adapted for electrical connection to the light source assembly, the output interface is mated and connected to the plugging portion of the electrical connector, and the first connecting terminal of the plugging portion is adapted for electrical connection to the light source assembly. Alternatively, the input interface is mated and connected to the plugging portion of the electrical connector, the first connecting terminal of the plugging portion is adapted for electrical connection (e.g., electrically connected) to the light source assembly, the output interface is mated and connected to the locking portion of the electrical connector, and the second connecting terminal of the locking portion is adapted for electrical connection (e.g., electrically connected) to the light source assembly.

The present disclosure may have certain technical advantages. For example, in the lamp of the present disclosure, the light source assembly emits light toward the cover plate, so that the light emitted by the light source assembly is reflected by the cover plate and then radiates to the side wall surface of the housing, and at least one side wall surface of the housing is provided as a light-emitting surface, such that the light emitted by the light source assembly can pass through the side wall of the housing to emit the light to outside. On the one hand, such structures can prevent users from being dazzled when they look directly at the lamps. On the other hand, the ambient light formed by the reflection of the light emitted from the side wall on the installation surface can better create a sense of atmosphere feel and bring users an immersive experience.

Further, the electrical connector connects two lamps using the plugging means and the clamping means, respectively, at the same time. Through the plugging portion, the electrical connector is conveniently connected with and disassembled from the first lamp along the first direction. The buckle on the connecting board can change the connection direction between the buckle and the second lamp, so that, when the second lamp is connected to the electrical connector, the locking portion is configured to fit and connect with the second lamp along the protruding direction of the buckle. It can avoid the current technical problems of, when the lamps are fixed on the installation surface with back adhesive and the second is connecting to the electrical connector, insufficient contact between the second lamp and the electrical connector, and a splicing gap between the first lamp and the second lamp, etc. It can also avoid the inconvenient installation of the electrical connector by using plugging alone or the complicated disassembly of the electrical connector by using clamping alone, facilitating the connection and disassembly of lamps and improving the connection efficiency.

Other aspects of the present disclosure can be understood by those skilled in the art in light of the description, the claims, and the drawings of the present disclosure.

BRIEF DESCRIPTION OF THE DRAWINGS

To describe the technical solutions of the embodiments of the present disclosure more clearly, the following briefly introduces the accompanying drawings used for describing the disclosed embodiments. Apparently, the accompanying drawings in the following description show merely some embodiments of the present disclosure, and a person of ordinary skill in the technology may derive other drawings from these accompanying drawings without creative efforts.

DETAILED DESCRIPTION

The following describes exemplary embodiments in detail, and examples of the embodiments are shown in the accompanying drawings, so as to better understand the present disclosure. Unless otherwise specified, a same number in different drawings may represent a same or similar element. The implementations described in the disclosed embodiments below do not represent all implementations consistent with the present disclosure, but are merely examples of the apparatus and the methods that are consistent with some aspects of the present disclosure, and should not be used for limiting the present disclosure. Further, as long as there is no conflict, the embodiments of the present disclosure and features of the embodiments may be combined with each other.

Those skilled in the art will understand that unless otherwise stated, the singular forms “a”, “an”, “said” and “the” used herein may also include plural forms. It should be further understood that the word “comprising” used in the description of the present disclosure refers to the presence of said features, integers, steps, operations, elements and/or components, but does not exclude the presence or addition of one or more other features, integers, steps, operations, elements and/or components, but does not preclude the presence or addition of one or more other features, integers, steps, operations, elements, components and/or groups thereof. It will be understood that when an element is referred to as being “connected” or “coupled” to another element, it can be directly connected or coupled to the other element or intervening elements may also be present. Additionally, “connected” or “coupled” as used herein may include wireless connection or wireless coupling. The expression “and/or” used herein includes all or any elements and all combinations of one or more associated listed items.

Those skilled in the art can understand that, unless otherwise defined, all terms (including technical terms and scientific terms) used herein have the same meaning as commonly understood by those of ordinary skill in the art to which this invention belongs.

One objective of the present disclosure is to provide a lamp, which can realize side-emitting light and the light can irradiate on the installation surface and is reflected to form ambient light, so as to create an ambient light atmosphere and give the user an immersive experience.

Another objective of the present disclosure is to provide an electrical connector, which can facilitate the connection and installation of lamps and improve installation efficiency.

Figure 1:
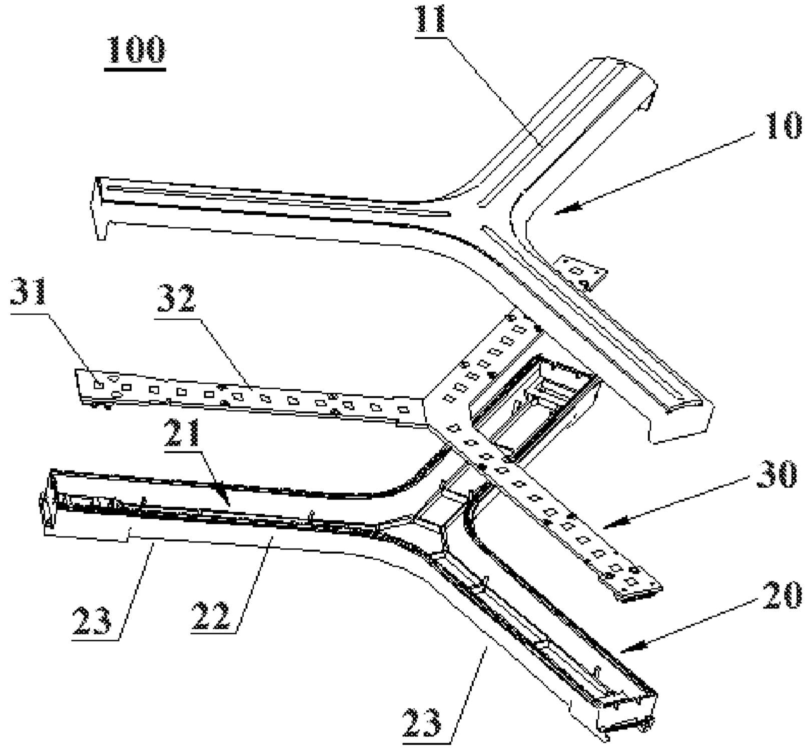
FIG. 1 illustrates an exploded schematic diagram of a lamp according to an embodiment of the present disclosure.

Referring to FIG. 1, FIG. 1 is an exploded schematic diagram of a lamp 100 according to an embodiment of the present disclosure. In one aspect of the present disclosure, a lamp 100 is provided. In one embodiment, the lamp 100 includes a cover plate 10, a housing 20, and a light source assembly 30. The housing 20 has an opening, the cover plate 10 is set on and covers the opening and, together with the housing 20, forms an enclosed accommodating space 21. The light source assembly 30 is used to provide light source for the lamp 100, and the light source assembly 30 can be arranged in the accommodating space 21. The light source assembly 30 is arranged to emit light toward the cover plate 10, so that the light emitted by the light source assembly 30 is reflected by the cover plate 10 and then radiates to the side wall of the housing 20. At least one side wall of the housing 20 is designed as a light-emitting surface 22, so that the light emitted by the light source assembly 30 can pass through the side wall of the housing 20 and emit light to the outside.

On the one hand, when the user looks directly at the lamp 100, this structure can avoid dazzling the user. On the other hand, using the side wall of the housing 20 as the light-emitting surface 22, the light emitted from the side wall can be reflected again at the installation surface to form ambient light, creating a sense of desired atmosphere and bringing the user an immersive experience. In one embodiment, the number of light-emitting surfaces 22 is specifically determined according to the shape of the housing 20 and/or the actual needs. For example, when the housing 20 is cylindrical, its side wall surface is the peripheral surface of the housing 20. At this time, the surrounding surface of the housing 20 is a light-emitting surface 22, and there is only one light-emitting surface 22. When the housing 20 is polygonal or other irregular shapes, the light-emitting surface 22 of the housing 20 is smaller than or equal to its side wall surface.

Specifically, as shown in FIG. 1, the light source assembly 30 includes a circuit board 32 and a plurality of light-emitting elements 31 mounted on the circuit board 32, and the plurality of light-emitting elements 31 are distributed on the circuit board 32 in an array. The plurality of light-emitting elements 31 include red LED light beads, green LED light beads, and blue LED light beads.

Figure 3:
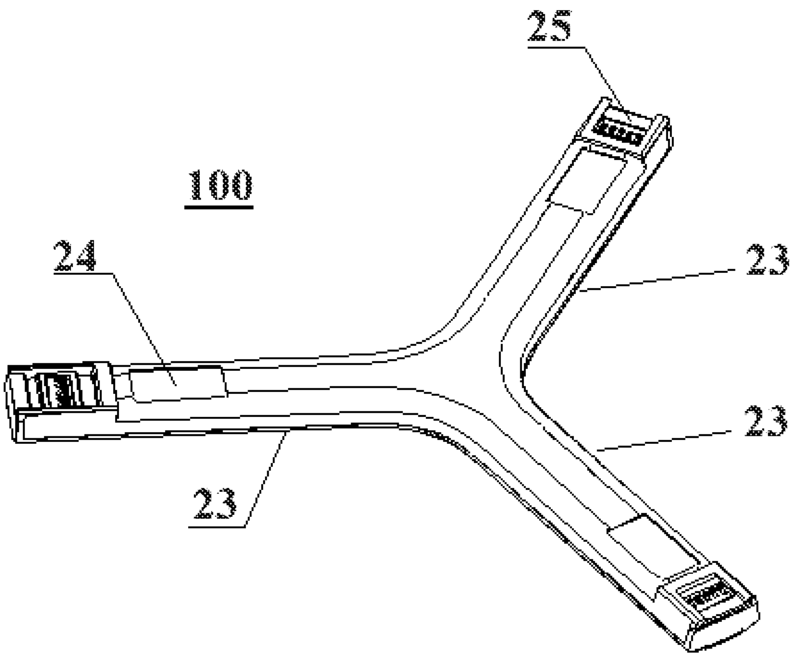
FIG. 3 illustrates a schematic bottom view of a lamp according to an embodiment of the present disclosure.

In some embodiments, as shown in FIG. 1 and FIG. 3, the housing 20 may include at least two sub-housings 23, and the at least two sub-housings 23 are spliced and connected together and may intersect at a single point. That is, the housing 20 has a radial structure that is centered on the intersection point. Specifically, the shape of the cover plate 10 corresponds to the shape of the housing 20 and also has a radial structure.

Figure 4:
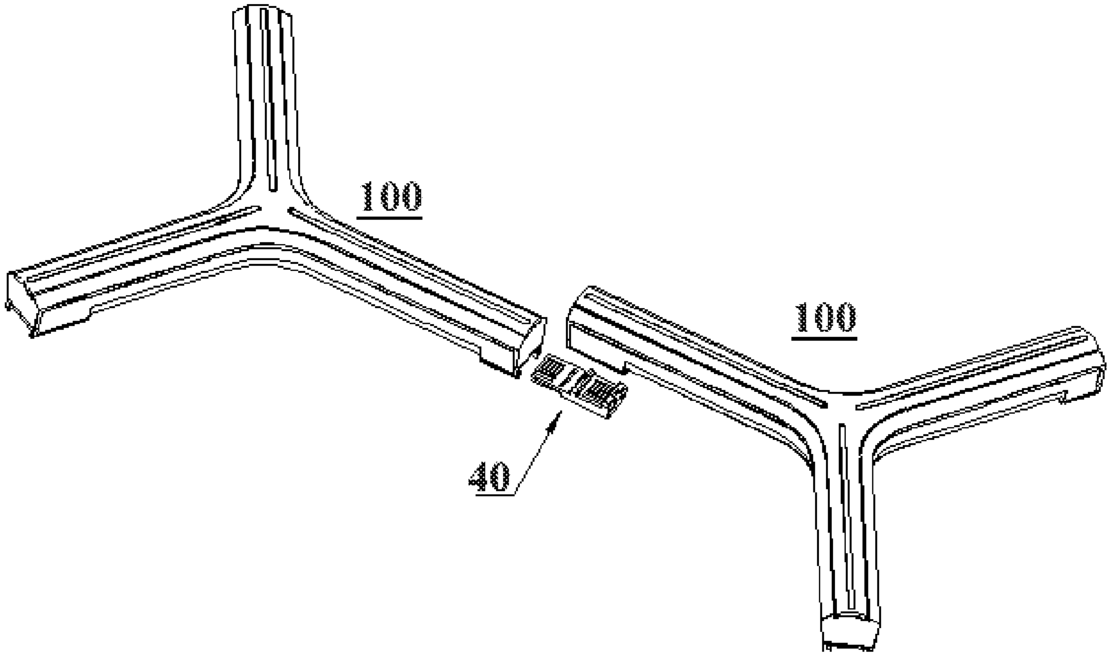
FIG. 4 illustrates a schematic diagram of a connection of two adjacent lamps through a connector in a lamp assembly system according to an embodiment of the present disclosure.
Figure 5:
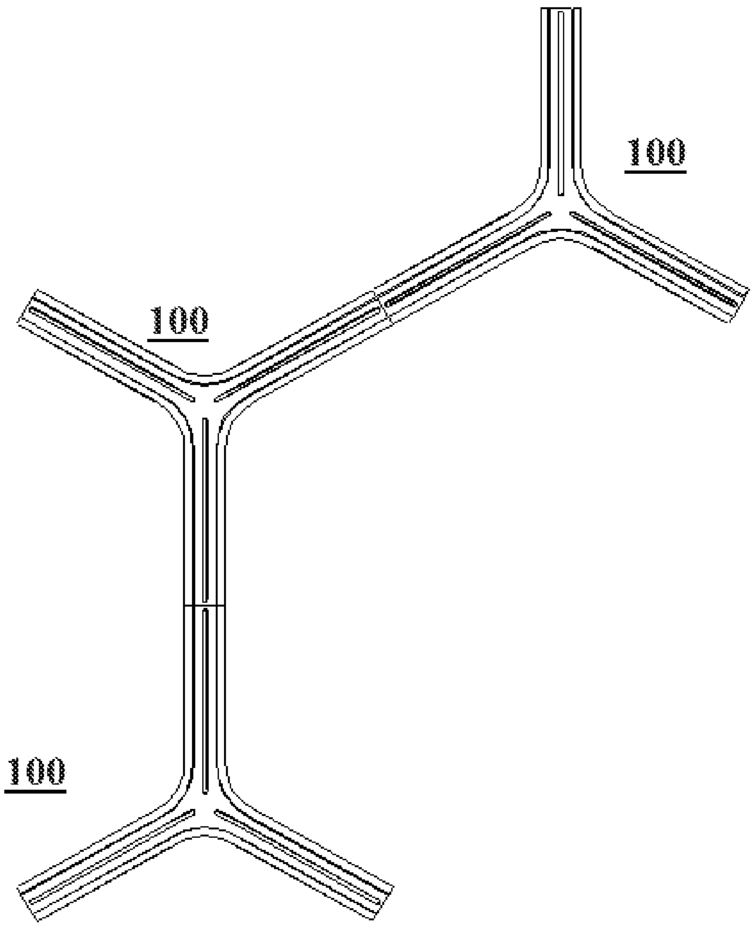
FIG. 5 illustrates a schematic diagram of a combination shape of a lamp assembly system according to an embodiment of the present disclosure.

Specifically, the sub-housing 23 can be in the shape of a cuboid. When there are two sub-housings 23, the two sub-housings 23 can be spliced and connected and intersect at one point to form a straight line or V-shaped shape. In this structure, the shape of the cover plate 10 also has the corresponding straight line or V-shaped shape. As shown in FIG. 1, FIG. 4, and FIG. 5, when the number of sub-housings 23 is three, the three sub-housings 23 are spliced and connected together and intersect at one point to form a Y-shape. In this structure, the cover plate 10 has the corresponding Y-shape. When the number of sub-housings 23 is four, the four sub-housings 23 are spliced and connected together and intersect at one point to form a cross shape. In this structure, the cover plate 10 has the corresponding cross shape. Understandably, the number of sub-housings 23 may also be five, six, seven, eight, etc., and one end of each of the sub-housings 23 intersects at one point. In one embodiment, to improve the aesthetics of the housing 20, when the number of sub-cases 23 is greater than or equal to three, the angle between any two adjacent sub-housings 23 is equal.

Specifically, as shown in FIG. 1, each sub-housing 23 includes a sub-cavity. After the at least two sub-housings 23 are spliced and intersected at one point, the at least two sub-cavities are connected and enclosed to obtain the accommodating space 21.

Specifically, as shown in FIG. 1, each sub-housing 23 is correspondingly provided with a sub-circuit board 32, and multiple sub-circuit boards 32 are spliced to obtain the circuit board 32, and the shape of the circuit board 32 is the same as that of the housing 20. Therefore, the circuit board 32 can be placed in the accommodating space 21.

Specifically, in one embodiment the housing 20 formed by splicing at least two sub-housings 23 is an integrally formed structure.

Specifically, in one embodiment, the cover plate 10 and the housing 20 can be connected by means of gluing, riveting, ultrasonic welding, etc. For example, the housing 20 is provided with ultrasonic wires, and the cover plate 10 is correspondingly provided with ultrasonic grooves. When the cover plate 10 and the housing 20 are connected, they are assembled and fitted together through an ultrasonic process.

Specifically, as shown in FIG. 3, a plurality of grooves 24 are provided on the back side of the housing 20 opposite to the accommodating space 21, and adhesive tape, magic stickers, or mushroom straps, etc., can be arranged in the grooves 24, so that the adhesive tape, magic stickers, or mushroom straps, etc., can glue the lamp 100 on the installation surface.

In some embodiments, the cover plate 10 can be provided with at least two light-transparent portions 11, so that each sub-housing 23 corresponds to at least one light-transparent portion 11. That is, after the cover plate 10 is placed on the housing 20, each part of the cover plate 10 corresponding to a sub-housing 23 is provided with at least one light-transparent portion 11, so that the light emitted by the light source assembly 30 can also be emitted from the front through the light-transparent portion 11. Thus, the lamp 100 has a three-dimensional light emitting effect, bringing the user a more immersive visual sense of light.

In some embodiments, the amount of light emitted by the light-transparent portion 11 may be smaller than that of the light-emitting surface 22 and, as such, the main visual effect of side lighting is not affected.

Figure 2:
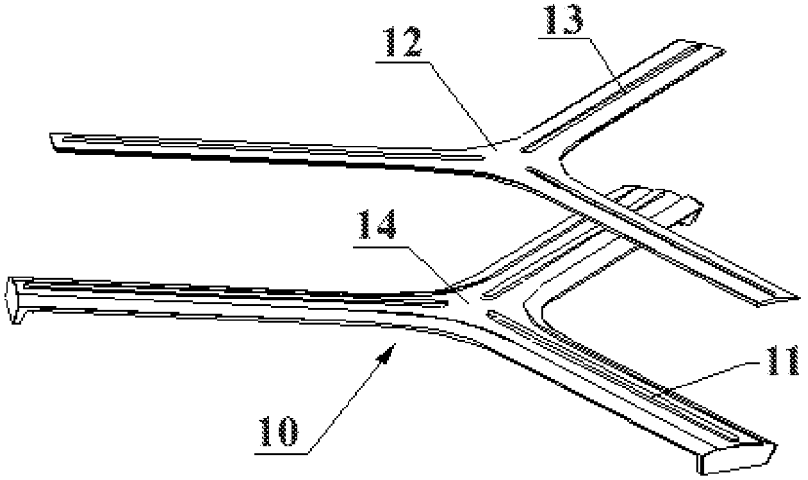
FIG. 2 illustrates an exploded schematic diagram of an upper housing of a lamp according to an embodiment of the present disclosure.

In some embodiments, as shown in FIG. 1 and FIG. 2, the light-transparent portion 11 can be strip-shaped, and the light-transparent portion 11 can be arranged along the splicing direction of the sub-housing 23. That is, the light-transparent portion 11 is arranged on the cover plate 10 along a length direction of the sub-housing 23. In practical applications, the light-transparent portion 11 may also be in other shapes, such as an arc shape, an S shape, or the like.

In some embodiments, the angle between the light-emitting surface 22 and the bottom surface of the sub-housing 23 is $\alpha$, and $90° \leq \alpha \leq 135°$. Since the ratio of refraction and reflection of light at the interface between the two media is related to the incident angle, the angle $\alpha$ between the light-emitting surface 22 and the bottom surface of the sub-housing 23 is optimized to increase the refraction ratio of light, that is, to increase utilization rate of the light.

Specifically, in one embodiment, $105° \leq \alpha \leq 115°$.

Specifically, the housing 20 can be made of Polycarbonate (PC) material, and the light-emitting surface 22 is further made of milky white translucent PC material. The light-transparent portion 11 can also be made of milky-white translucent PC material, or the light-transparent portion 11 can also be a transparent glass piece.

In some embodiments, a reflective structure (not shown) may be provided in the accommodating space, and the reflective structure may be used to reflect part of the light emitted by the light source assembly 30 to the light-emitting surface 22. Through the reflective structure, the utilization rate of the light is increased, so as to further improve the brightness and lumens of the lamp 100.

In some embodiments, the reflective structure may include reflective paper or a reflective layer. The reflective paper or reflective layer is arranged on the surface of the cover plate 10 facing the light source assembly 30. For example, the reflective paper is pasted on the cover plate 10 facing the light source assembly 30, or the surface of the cover plate 10 facing the light source assembly 30 is coated with a reflective layer. At the same time, the reflective paper or reflective layer is provided with avoidance areas, the number of avoidance areas is the same as the number of light-transparent portions 11, and one avoidance area corresponds to one light-transparent portion 11, so that part of the light can pass through the avoidance areas and enter the transmissive area of light-transparent portions 11, realizing light emission from the light-transparent portions 11.

In some embodiments, the surface of the cover plate 10 facing the light source assembly 30 can be recessed along the direction away from the light source assembly 30. That is, the surface of the cover plate 10 facing the light source assembly 30 is an arc surface, so as to further improve the light output efficiency of the surface 22 to ensure the side-emitting light effect.

In some embodiments, the reflective structure may include an angle adjustment assembly and a reflector. The reflector is rotatably connected to the housing 20, the angle adjustment component is used to adjust the angle of the reflector relative to the cover plate 10, and the range of the angle of light reflection can be adjusted, realizing the adjustment of multi-angle light emission, so that the lamp 100 has more flexible and various light projection angle adjustments, and the lighting effect is improved.

Specifically, each sub-housing 23 is correspondingly provided with the above-mentioned angle adjustment assembly and reflector, and the opposite ends of the reflector can be respectively connected with rotating shafts. The two ends of each sub-housing 23 are provided with mounting brackets, and the mounting bracket is provided with a shaft hole matched with the rotating shaft of the reflector. The angle adjustment assembly may include a motor, and the output shaft of the motor may be connected to one of the rotating shafts through a transmission assembly (such as a gear assembly), so that the reflector may be driven to rotate by the motor.

According to different needs in different occasions, such as hotel lobbies, entertainment venues, home environments, etc., in order to heighten the atmosphere feel, multiple above-mentioned lamps 100 can be installed to combine them into different shapes and patterns to achieve decorative effects. Therefore, another aspect of the present disclosure, as shown in FIG. 4 and FIG. 5, further provides a lamp assembly system, which includes at least two lamps 100 in some of the above-mentioned embodiments. More specifically, two adjacent lamps 100 can be directly spliced to realize electrical connection, or two adjacent lamps 100 can realize electrical connection by an electrical connector, or two adjacent lamps 100 can realize electrical connection and mechanical connection by an electrical connector 40.

In one embodiment, referring to FIG. 1 to FIG. 5, the sub-housing 23 can be in the shape of a cuboid, the number of the sub-housings 23 is three, and the three sub-housings 23 are spliced and connected to form a Y-shaped housing 20 after intersecting at one point. Correspondingly, the cover plate 10 and the circuit board 32 are also Y-shaped, the circuit board 32 is installed in the accommodating space 21 of the housing 20, and the cover plate 10 is set on and covers the housing 20, thereby obtaining a Y-shaped lamp 100. The circuit board 32 is formed by splicing three sub-circuit boards 32, and each sub-circuit board 32 is arranged with a plurality of LED lamp beads in rows along its length direction. The two side walls of the sub-housing 23 corresponding to the length and height sides are the light-emitting surfaces 22, so that the housing 20 has six light-emitting surfaces 22, and the cover plate 10 is provided with three light-transparent portions 11, each sub-housing 23 corresponding to one light-transparent portion 11.

Specifically, in one embodiment, the angle between the light-emitting surface 22 of each sub-housing 23 and the bottom surface is greater than 90°. That is, the distance between the two light-emitting surfaces 22 of each sub-housing 23 near the bottom surface is smaller than the distance between the two light-emitting surfaces 22 of each sub-housing 23 away from the bottom surface. The cross-section of the sub-housing 23 may be trumpet-shaped, so that when the light passing through the light-emitting surface 22 is irradiated on the installation surface, it has a desired effect of creating an atmosphere feel.

Specifically, in one embodiment, the side surface of the cover plate 10 facing the light source assembly 30 is an arc surface, and reflective paper is pasted on the side surface, and an avoidance area corresponding to each light-transparent portion 11 are cut out on the reflective paper.

Specifically, in one embodiment, as shown in FIG. 2, the cover plate 10 further includes a decorative part 12, and the decorative part 12 is provided with an installation hole 13. The installation hole 13 is used for installing the light-transparent portion 11. The decorative part 12 and the cover plate 10 can be connected by injection molding, or by a detachable connection. The decorative part 12 can be made of materials such as metal or plastic, and the decorative effect can also be achieved by using different materials from the cover plate 10. When the decorative part 12 and the cover plate 10 are made of the same material, different colors can also be used to achieve the decorative effect.

Specifically, in one embodiment, as shown in FIG. 2, when the decorative part 12 and the cover plate 10 are connected in a detachable manner, the cover plate 10 is also provided with a mounting groove 14 whose shape corresponds to that of the decorative part 12. Then the decorative part 12 is fixed on the cover plate 10 by dispensing glue.

Specifically, in one embodiment, as shown in FIG. 4 and FIG. 5, two adjacent Y-shaped lamps 100 can be connected through a connector 40 to realize the mechanical connection and electrical connection between two adjacent Y-shaped lamps 100. The user can combine multiple Y-shaped lamps 100 according to actual needs, so as to create a unique visual spatial layout and create just the right atmosphere lighting. Each sub-housing 23 is provided with an interface 25 matched with the connector 40 at the end away from the intersection point.

Figure 6:
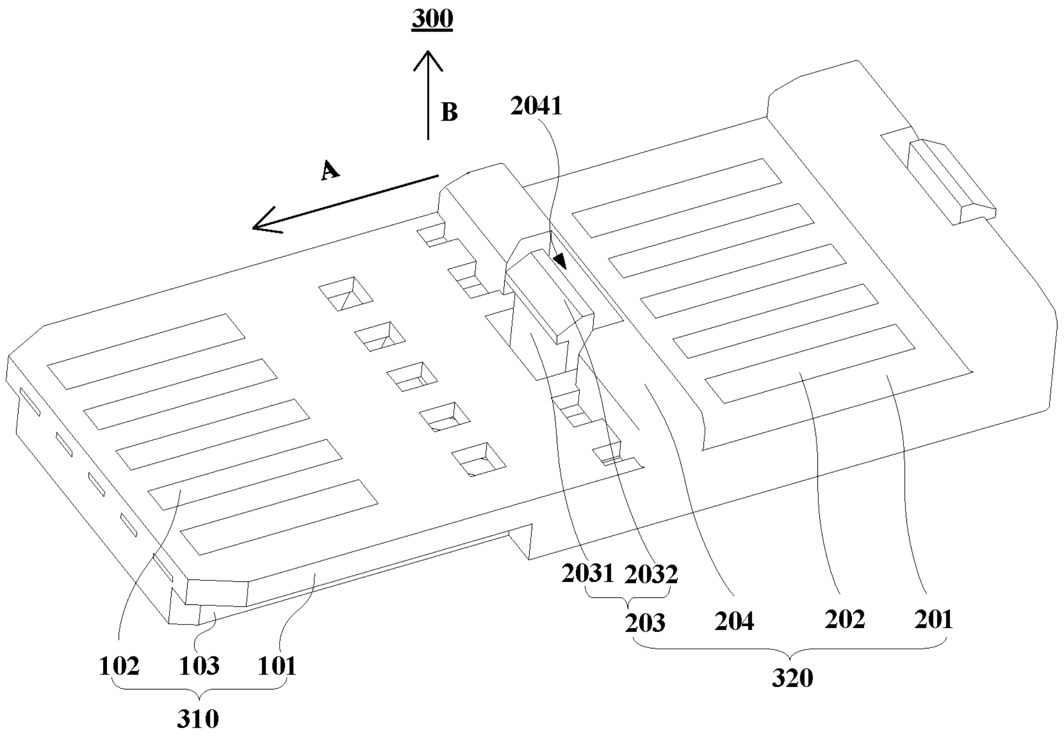
FIG. 6 illustrates a schematic side view of an electrical connector according to an embodiment of the present disclosure.

Referring FIG. 6, in one aspect of the present disclosure, an electrical connector 300 is provided (same or similar to electrical connector 40). The electrical connector 300 includes a plugging portion 310, and a locking portion 320 connected to the plugging portion 310. It can be understood that the electrical connector 300 can be configured to be detachably connected to two lamps to realize the electrical connection and mechanical connection of the two lamps.

The plugging portion 310 includes a plugging board 101 and a first connecting terminal 102 disposed on the plugging board 101. The plugging board 101 is plug-fitted with the first lamp along a first direction to realize mechanical connection in the connection structure and, at the same time, realizes electrical connection with the first lamp through the first connecting terminal 102. The first direction is the plugging in direction, that is, the moving direction of the plug board 101 when the plugging board 101 is connected and mated with the first lamp, referring to direction A in FIG. 6. The first connecting terminal 102 has a conductive function. It can be understood that the first connecting terminal 102 may be electrical connection contact points arranged on the plugging board 101, that is, the first connecting terminal 102 may be a metal sheet laid flat on the plugging board 101, or an elastic metal sheet protruding above the plugging board 101.

The locking (or clamping) portion 20 includes a connecting board 201 connected to the plugging board 101 along the first direction, and a second connecting terminal 202 is disposed on the connecting board 201. The second connecting terminal 202 is adapted for electrical connection to the second lamp, and the second connecting terminal 202 is adapted for electrical connection to the first connecting terminal 102. That is, the second connecting terminal 202 has a conductive function, and can electrically connect the first connecting terminal 102 and the second lamp, so as to realize the electrical connection between the first lamp and the second lamp.

At least one buckle 203 can also protrude from the connecting board 201, so that an angle is formed between the protruding direction of the buckle 203 and the connecting board 201. When the locking portion 320 cooperates with the second lamp, the second lamp clamps with the buckle 203 in the direction towards the buckle 203. Because the direction in which the connecting board 201 and the plugging board 101 are connected is the first direction, and the protruding direction of the buckle 203 and the connecting board 201 form an angle, an angle is formed between the first direction and the protruding direction of the buckle 203, so that the electrical connector 300 can be installed to adjacent lamps from different directions. The buckle 203 can be arranged on the upper end surface and/or the side end surface of the connecting board 201. That is, when the connecting board 201 is provided with a buckle 203, the buckle 203 can be arranged on the upper end surface of the connecting board 201, or it is be arranged on the side end surface of the connecting board 201. When the connecting board 201 is provided with a plurality of buckles 203, the plurality of buckles 203 can be arranged on the upper end surface of the connecting board 201, or the plurality of buckles 203 can be arranged on the side end surface of the connecting board 201, or a part of buckles 203 are disposed on the upper end surface of the connecting board 201, and a part of buckles 203 are disposed on the side end surface of the connecting board 201.

In certain embodiments, referring to FIG. 6, the B direction is the protruding direction of the buckle 203, that is, the locking portion 320 can be buckled with the second lamp along the B direction, so as to realize the mechanical connection between the locking portion 320 and the second lamp. It can be understood that direction B may be perpendicular to direction A. Similarly, the second connecting terminal 202 can be electrical connection contact points arranged on the connecting board 201. That is, the second connecting terminal 202 can be a metal sheet laid flat on the connecting board 201, or an elastic metal sheet protrude from the connecting board 201.

Accordingly, the electrical connector 300 connects two lamps using the plugging means and the clamping means, respectively, at the same time. Through the plugging portion 310, the electrical connector 300 is conveniently connected with and disassembled from the first lamp along the first direction. The buckle 203 on the connecting board 201 can change the connection direction between the buckle 20 and the second lamp, so that, when the second lamp is connected to the electrical connector 300, the locking portion 320 is configured to fit and connect with the second lamp along the protruding direction of the buckle 203. Especially, when the lamp is fixed on the installation surface with adhesive, using the ways of plugging at one end and snapping at the other end, where the plugging direction and the snapping direction are designed to be different, certain issues of using the ways of plugging at both ends can be resolved. For example, this approach may prevent that, when the second lamp is getting close to the electrical connector 300 along the plugging direction, the connection of the second lamp may not be in place because due to the back glue of the second lamp sticking to the installation surface, thus causing the insufficient contact between the second lamp and the second connecting terminal 202, or causing a splicing gap between the first lamp and the second lamp. Further, this approach can also avoid the inconvenient installation of the electrical connector 300 by using plugging alone or the complicated disassembly of the electrical connector 300 by using snapping or clamping alone, facilitating the connection and disassembly of lamps and improving the connection efficiency.

In some embodiments, the connecting board 201 and the plugging board 101 are arranged horizontally or parallel to each other. It can be understood that the connecting board 201 is connected to the plugging board 101 along the first direction, and the connecting board 201 and the plugging board 101 are arranged horizontally to each other, which may include the following situations: the upper end surface of the plugging board 101 and the upper end surface of the connecting board 201 are flush, or the lower end surface of the plugging board 101 and the lower end surface of the connecting board 201 are flush, or both the upper and lower end surfaces of the plugging board 101 are flush with both the upper and lower end surfaces of the connecting board 201.

Further, referring to FIG. 6, further details of the specific structure of the plugging portion 310 of the electrical connector 300 are described below, and the direction A in FIG. 6 is the insertion direction.

In one embodiment, the plugging portion 310 further includes a guide block 103 disposed on the plugging board 101, and the guide block 103 and the first connecting terminal 102 are respectively located on opposite sides of the plugging board 101. The width of the guide block 103 is smaller than the width of the insertion board 101 in the direction perpendicular to the first direction, that is, the insertion direction. Thus, steps are formed on opposite sides of the guide block 103 and the plugging board 101 along the insertion direction. When the plugging portion 310 is connected to the first lamp, the guide block 103 is equivalent to a slide rail, which can increase the stability of the plugging connection, avoiding the deviation of the plugging portion 310 caused by uneven force during sliding, which can cause poor contact between the first connecting terminal 102 of the electrical connector 300 and the lamp 200, insertion gap, and the like.

It can be understood that, in some other embodiments, the guide block 103 may also include a first guide portion and a second guide portion. The first guide portion and the second guide portion are sequentially stacked on the plugging board 101, the width of the first guide portion in the direction perpendicular to the insertion direction is different from that of the second guide portion, and the width of the first guide portion in the direction perpendicular to the insertion direction is smaller or greater than the width of the insertion board 101. Thus, the guide block 103 and the plugging board 101 form a plurality of steps on opposite sides along the insertion direction, so as to achieve a guiding function when the plugging board 101 is inserted into the lamp 200.

Still referring to FIG. 6, further details of the specific structure of the locking portion 320 are described in the following.

Specifically, in one embodiment, the connecting board 201 is connected to the plugging board 101 along the first direction, and the connecting board 201 may be directly and rigidly connected to the plugging board 101. The first connecting terminal 102 and the second connecting terminal 202 are co-planarly arranged.

In some embodiments, the locking portion 320 further includes at least one locking boss 204 connected to the connecting board 201, and the buckle 203 is disposed on the locking boss 204. The locking boss 204 can realize the guiding function during the clamping process.

In some embodiments, the locking boss 204 is provided with a mounting groove 2041, and the buckle 203 includes a clamping strip 2031. Further, the clamping strip 2031 of the buckle 203 protrudes from the bottom wall of the installation groove 2041 and extends to be exposed in the installation groove 2041, and one end of the clamping strip 2031 exposed in the installation groove 2041 is provided with a hook 2032. The clamping strip 2031 is separated from the mounting groove 2041, the clamping strip 2031 has a certain degree of elasticity, and the clamping strip 2031 can elastically deform under force when it is clamped, and the mounting groove 2041 can provide a certain avoidance space for the clamping strip 2031, realizing improved installation and disassembly of the buckle 203. The hook 2032 can be arranged facing away from the locking boss 204, so as to realize the clamping with the lamp 200 during the clamping connection.

It can be understood that, one locking boss 204, or two locking bosses 204, or even a plurality of locking bosses 204 can be arranged on the connecting board 201. One buckle 203 can be arranged on one locking boss 204, or two buckles 203 also can be arranged on one locking boss 204, or a plurality of buckles 203 also can be arranged on one locking boss 204. The buckle 203 can be arranged on the side of the locking boss 204 or can be arranged on the upper end surface of the locking boss 204, as long as a stable clamping connection can be achieved according to the clamping connection between the connecting board 201 and the second lamp.

In some other embodiments, the buckle 203 may be directly disposed on the upper surface of the locking boss 204, and the locking boss 204 does not need to be provided with the installation groove 2041. That is, the buckle 203 may only include a hook 2032, and the hook 2032 may be disposed at the edge of the locking boss 204 and extend outward from the locking boss 204, so as to realize the snapping or clamping connection with the lamp 200.

In order to further illustrate the situation that a plurality of locking bosses 204 are provided on the connecting board 201, for example, two locking bosses 204 and buckle 203 are arranged on the connecting board 201, and the locking bosses 204 are provided with the installation grooves 2041.

Specifically, in some embodiments, the connecting board 201 includes two locking bosses 204 arranged at an interval, and the second connecting terminal 202 is located between the two locking bosses 204. For example, the two locking bosses 204 can be arranged at an interval along the insertion direction of the plugging portion 310. In one embodiment, there are also two buckles 203, and the hooks 2032 of the buckles 203 are away from each other.

Specifically, in one embodiment, the installation groove 2041 can be arranged at the center of the locking boss 204, and the installation groove 2041 is arranged on a side of one locking boss 204 away from the other locking boss 204. The clamping strips 2031 of the two buckles 203 are respectively disposed in the two installation grooves 2041, and the hooks 2032 exposed in the installation grooves 2041 are away from each other. It can be understood that the installation groove 2041 can also be arranged on the side of one locking boss 204 facing the other locking boss 204 and, at this time, the hooks 2032 face each other.

It should be noted that, during connection, the plugging portion 310 and the locking portion 320 do not interfere with each other when they are snapped in and plugged in. Therefore, any disclosed plugging portion 310 can be combined with any disclosed locking portion 320 to form an electrical connector 300 including different structures of the plugging portion 310 and the locking portion 320.

It should be noted that, in some other specific embodiments, the plugging portion 310 and the locking portion 320 can also be connected together through a rigid connection part. The rigid connection part can be arranged along the B direction and, thus, the plugging portion 310 and the locking portion 320 connected by the rigid connection part have a certain distance in the B direction.

Figure 7:
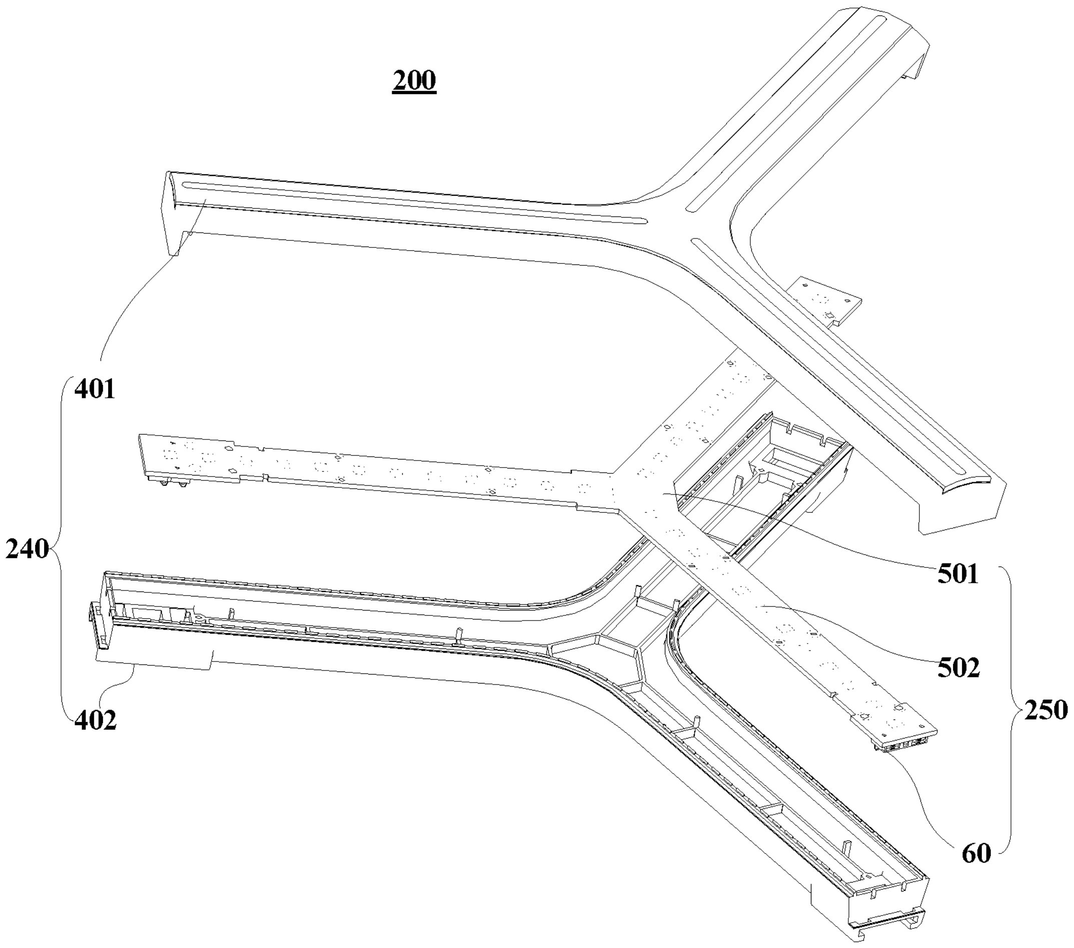
FIG. 7 illustrates an exploded schematic diagram of another lamp, where a housing includes an upper housing and a lower housing connected to the upper housing according to an embodiment of the present disclosure.
Figure 8:
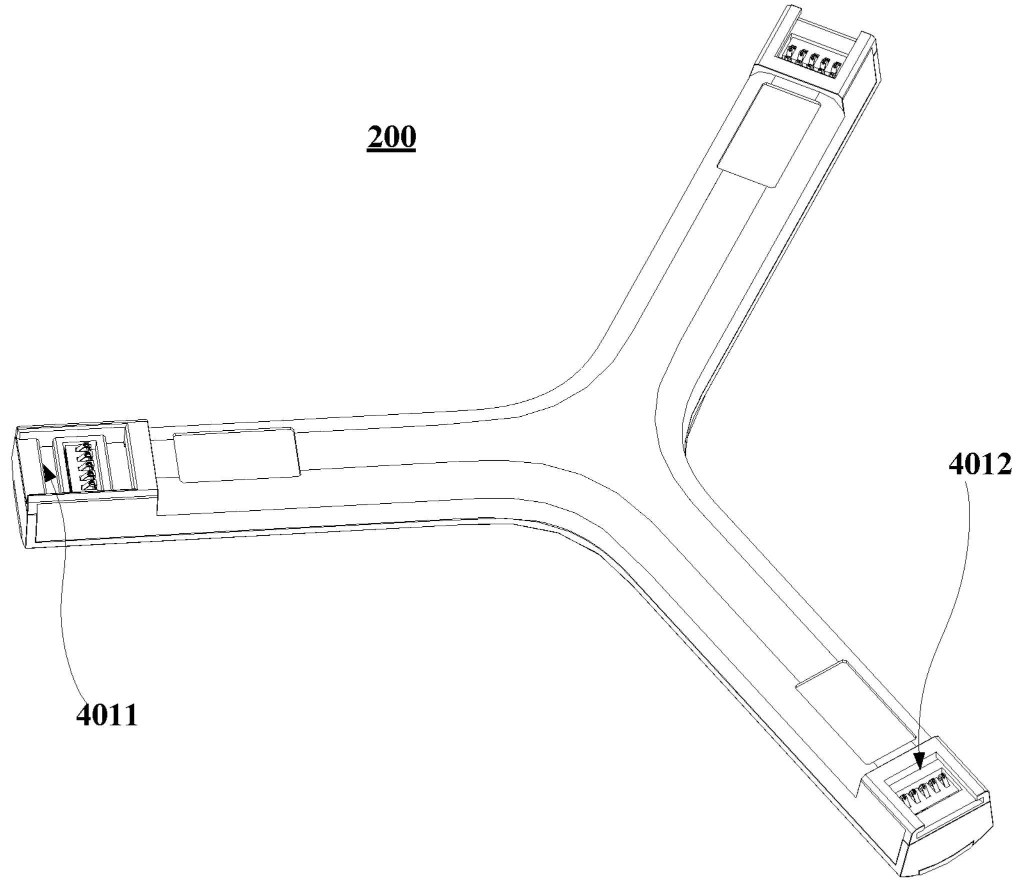
FIG. 8 illustrates a schematic bottom view of another lamp according to an embodiment of the present disclosure.

Referring to FIG. 7 and FIG. 8, in another aspect of the present disclosure, a lamp 200 is provided. The lamp 200 includes the electrical connector 300, a housing 240, and a light source assembly 250 disposed in the housing 240.

The housing 240 is also provided with an input interface 4011 and at least one output interface 4012. The input interface 4011 is mated and connected with the locking portion 320 of the electrical connector 300, and the second connecting terminal 202 of the locking portion 320 is adapted for electrical connection with the light source assembly 250. The output interface 4012 is mated and connected with the plugging portion 310 of the electrical connector 10, and the first connecting terminal 102 of the plugging portion 310 is adapted for electrical connection with the light source assembly 250. It can be understood that each input interface 4011 and each output interface 4012 on the lamp 200 need to be connected to an electrical connector 300 separately, and are mated and connected with the plugging portions 10 and locking portion 320 of different electrical connectors 300.

Optionally, the input interface 4011 can also be mated and connected with the plugging portion 310 of the above-mentioned electrical connector 300, and the first connecting terminal 102 of the plugging portion 310 is adapted for electrical connection with the light source assembly 250. The output interface 4012 is mated and connected with the locking portion 320 of the above-mentioned electrical connector 300, and the second connecting terminal 202 of the locking portion 320 is adapted for electrical connection to the light source assembly 250.

The light source assembly 250 may further include at least two electrical connection terminals 60, and one electrical connection terminal 60 may be installed in the input interface 4011 and the output interface 4012 respectively. The electrical connection terminal 60 may include an electrical connection contact provided on the light source assembly 250, or may include a battery seat spring provided on the light source assembly 250, and the battery seat spring has an elastic metal strip. The specific structure of the electrical connection terminal 60 needs to be selected according to the structure of the connecting terminals of the electrical connector 300, and the electrical connection between the electrical connection terminal 60 and the electrical connector 300 is realized through the cooperation of the electrical connection contacts and the elastic metal strip.

Specifically, in one embodiment, the housing 240 may include an upper housing 2401 and a lower housing 2402 connected to the upper housing 2401, or the housing 240 may be a hollow one piece shell to accommodate the light source assembly 250 and the electrical connection terminal 60 for providing power to the light source assembly 250. It can be understood that when the housing 240 is composed of the upper housing 2401 and the lower housing 2402, the input interface 4011 and the output interface 4012 may be both disposed in the lower housing 2402.

Referring to FIG. 6, FIG. 8-FIG. 10, in some embodiments, both the input interface 4011 and the output interface 4012 are disposed at the end of the lamp 200, and pass through the end surface of the housing 240 of the lamp 200 without interfering with each other. The end surface is the closest to the edge of the part structure.

Figure 10:
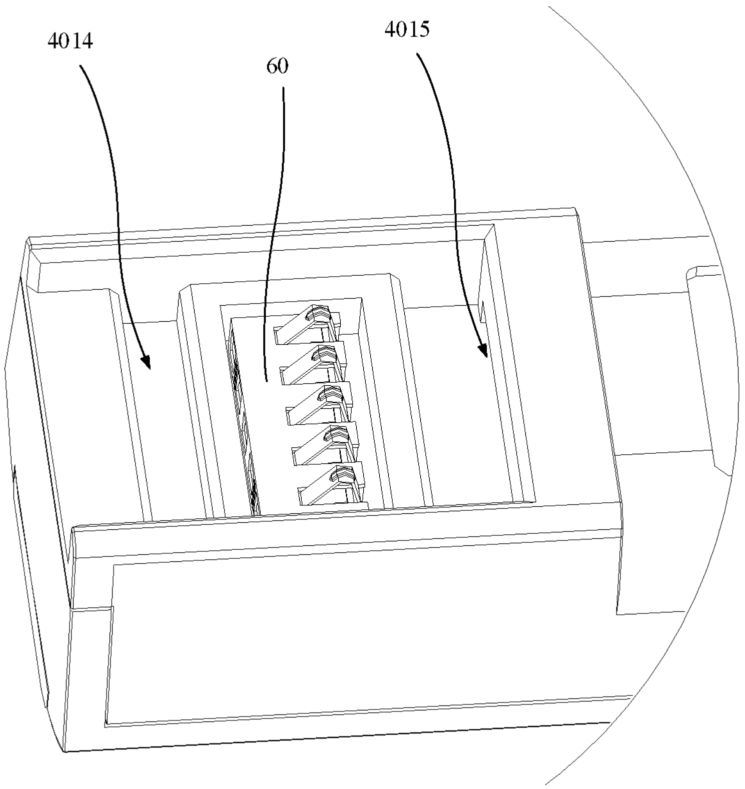
FIG. 10 illustrates a partially enlarged schematic diagram of a lamp including an input interface according to an embodiment of the present disclosure.

Referring to FIG. 8 and FIG. 10, in some embodiments, the input interface 4011 includes a clamping groove 4014, and the clamping groove 4014 is arranged at the end of the lamp 200, and runs through the bottom surface of the housing 240 of the lamp 200. The bottom surface of the housing 240 of the lamp 200 refers to the side of the lamp 200 facing the installation surface when the lamp 200 is installed. When the clamping groove 4014 of the lamp 200 is connected to the locking portion 320 of the electrical connector 300, the locking boss 204 is guided, and the locking boss 204 is snapped in the clamping groove 4014, and the second connecting terminal 202 and the electrical connection terminal 60 are electrically connected to each other.

To avoid poor contact caused by the locking boss 204 falling off or loosening from the clamping groove 4014, in one embodiment, the clamping groove 4014 is further provided with an engaging slot 4015 matching the buckle 203 of the locking portion 320. It can be understood that the number and positions of the engaging slots 4015 are determined according to the number and positions of the buckles 203, as long as the snap fitting between the buckles 203 and the engaging slots 4015 is satisfied. For example, the engaging slots 4015 are disposed on the two side walls of the clamping groove 4014 perpendicular to the first direction.

Figure 9:
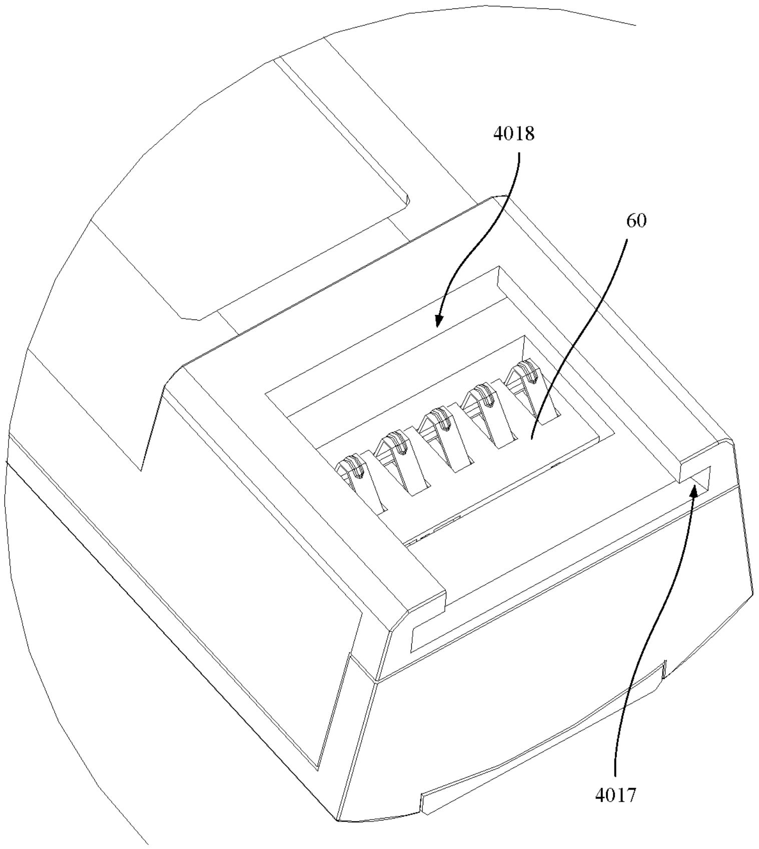
FIG. 9 illustrates a partially enlarged schematic diagram of a lamp including an output interface according to an embodiment of the present disclosure.

Referring to FIG. 8 and FIG. 9, in some embodiments, the output interface 4012 includes a socket 4017, and the socket 4017 is arranged at the end of the lamp 200 along the first direction. The end of the lamp 200 may refer to, when two lamps 200 are spliced together, the portion that is in contact between the two lamps 200. For example, when the housing 240 of the lamp 200 is bar-shaped, the ends refer to the two ends of the bar-shaped housing. When the housing 240 of the lamp 200 is Y-shaped, the ends refer to the three ends of the Y-shaped housing. When the housing 240 of the lamp 200 is polygonal shaped, the end refers to each end surface where the sides of the corresponding polygonal housing are located. Thus, when the socket 4017 of the lamp 200 is connected to the plugging portion 310 of the electrical connector 300, the plugging portion 310 is inserted into the socket 4017, and the first connecting terminal 102 contacts and is electrically conductive with the electrical connection terminal 60.

In order to make insertion more effective, the output interface 4012 is provided with a guide groove 4018 along the first direction. The guide groove 4018 communicates with the socket 4017 and runs through the bottom surface of the housing 240. Thus, when the socket 4017 of the lamp 200 is connected to the plugging portion 310 of the electrical connector 300, the guide groove 4018 cooperates with the guide block 103 to guide the direction. It can be understood that the guide groove 4018 cooperates with the guide block 103, so the width of the guide groove 4018 and the socket 4017 perpendicular to the insertion direction is determined by the width of the guide block 103 and the plugging board 101 perpendicular to the insertion direction.

In some embodiments, the housing 240 is Y-shaped, arc-shaped, or polygonal-shaped.

The light source assembly 250 may further include a PCB board 501 and LED lights 502. The PCB board 501 is a circuit board, and the LED lights 502 are arranged on the PCB board 501.

In some embodiments, the electrical connection terminal 60 can be an elastic strip, and the elastic strip is arranged on the side of the PCB board 501 opposite to the LED lights 502, and the electrical connection between the elastic strip and the PCB board 501 is arranged. It can be understood that, when the housing 240 includes an upper housing 2401 and a lower housing 2402 connected to the upper housing 2401, the elastic strip and the PCB board 501 are installed in the lower housing 2402, and the light-emitting surface of the LED light 502 installed on the PCB board 501 is facing the upper housing 2401.

In some embodiments, the housing 240 of the lamp 200 may be fixed on the installation surface by glue or screw connection. When the housing 240 is fixed with adhesive, the plugging portion 310 of the electrical connector 300 is first connected to the first lamp that is glued to the installation or mounting surface with adhesive, and then connected to the second lamp that needs to be installed by snapping connection. The two lamps are connected, and the second lamp is engaged with the buckle 203 to the installation surface of the second lamp. In this way, it can avoid that the glue of the second lamp connected to the locking portion 320 adheres to the installation surface, causing difficulty for the second lamp to be moved, resulting in poor contact between the second lamp and the electrical connector 300, or causing the second lamp and the electrical connector 300 to be in poor contact, or causing a splicing gap between the first lamp and the second lamp.

In another aspect of the present disclosure, there is also provided another lamp assembly system. The lamp assembly system includes at least two lamps 200 and at least one electrical connector 300, and the at least two lamps 200 are electrically connected and mechanically connected through the electrical connector 300. The electrical connector 300 connects the lamps 200 into a lamp assembly system. Details of the lamp 200, the electrical connector 300, and the connection thereof is described above, is not repeated here.

The terms "first", "second", and "third" used in this disclosure are used for description purposes only, and should not be understood as specifying the number of indicated technical features. Thus, features defined as "first", "second", and "third" may explicitly or implicitly include at least one of these features. All directional indications (such as up, down, left, right, front, back . . . ) in the embodiments of this disclosure are only used to explain the relative positional relationship between the components in a certain posture (as shown in the figures), sports conditions, etc., if the specific posture changes, the directional indication also changes accordingly. Furthermore, the terms "include" and "have", as well as any variations thereof, are intended to cover a non-exclusive inclusion. If a process, method, system, product, or apparatus comprising a series of steps or units is not limited to the listed steps or units, but optionally also includes steps or units not listed, or optionally further includes other steps or units inherent in these processes, methods, products, or apparatuses.

Those skilled in the art can understand that the various operations, methods, and steps, measures, and schemes in the processes that have been discussed in this disclosure can be replaced, changed, combined, or deleted. Furthermore, the various operations, methods, and other steps, measures, and schemes in the process that have been discussed in this disclosure can also be replaced, changed, rearranged, decomposed, combined, or deleted. Further, steps, measures, and schemes in the prior art that have operations, methods, and processes disclosed in the present disclosure may also be alternated, changed, rearranged, decomposed, combined, or deleted.

Finally, it should be noted that: the above embodiments are only used to illustrate the technical solutions of the present disclosure, but not to limit the present disclosure. Although the present disclosure has been described in detail with reference to the foregoing embodiments, those of ordinary skill in the art should understand that modifications can be made to the technical solutions described in the foregoing embodiments, or equivalent replacements are made to some of the technical features; and these modifications or replacements do not drive the essence of the corresponding technical solutions away from the spirit and scope of the technical solutions of the various embodiments of the present disclosure.

What is claimed is:

1. A lamp, comprising:

a cover plate, a housing, and a light source assembly, wherein:

at least one side wall of the housing is a light-emitting surface;

the cover plate and the housing are enclosed to form an accommodating space;

the light source assembly is arranged in the accommodating space; and the light source assembly emits light toward the cover plate, wherein:

the housing includes at least two sub-housings, and the at least two sub-housings are spliced together and intersect at a single point, the at least two sub-housings include a first sub-housing and a second sub-housing, and a distal end of the first sub-housing includes a first connection member configured for electrically and mechanically connecting with a plugging portion of a type of connector in a first direction, and a distal end of the second sub-housing includes a second connection member configured for electrically and mechanically connecting with a locking portion of the type of connector in a second direction, different from the first direction, wherein the plugging portion is removably plug-fitted with the first connection member in the first direction, and the locking portion includes at least one buckle to removably lock with the second connection member, and the plugging portion and the locking portion are integral parts of the type of connector.

2. The lamp according to claim 1, wherein:

the first direction is perpendicular to the second direction.

3. The lamp according to claim 2, wherein:

the cover plate is provided with at least two light-transparent portions, and each of the sub-housings corresponds to at least one of the light-transparent portions.

4. The lamp according to claim 3, wherein an amount of light output from the light-transparent portion is smaller than an amount of light output from the light-emitting surface.

5. The lamp according to claim 4, wherein a reflective structure is provided in the accommodating space, and the reflective structure is used to reflect part of the light emitted by the light source assembly to the light-emitting surface.

6. The lamp according to claim 5, wherein:

the reflective structure includes reflective paper or a reflective layer;

the reflective paper or reflective layer is arranged on a side surface of the cover plate facing the light source assembly; and the reflective paper or reflective layer is provided with an avoidance area corresponding to a light-transparent portion.

7. The lamp according to claim 5, wherein a surface of the cover plate facing the light source assembly is recessed away from the light source assembly.

8. The lamp according to claim 5, wherein the reflective structure comprises an angle adjustment assembly and a reflector, the reflector is rotatably connected to the housing, and the angle adjustment assembly is used to adjust a reflection angle of reflector relative to the cover plate.

9. The lamp according to claim 1, wherein the angle between the light-emitting surface and a bottom surface of the housing is 60 , and $90° \leq \alpha \leq 135°$.

10. A lamp assembly system, comprising at least two lamps according to claim 1, wherein:

any two adjacent lamps are spliced and connected, any two adjacent lamps are electrically connected through a connector, or any two adjacent lamps are electrically connected and mechanically connected through a connector, the distal end of the first sub-housing of one of the two adjacent lamps is removably connected to the distal end of the second sub-housing of the other one of the two adjacent lamps through the same connector, and the first sub-housing of one of the two adjacent lamps and the second sub-housing of the other one of the two adjacent lamps are assigned in a straight line.

* * * * *